United States Patent
Loracks et al.

[11] Patent Number: 5,910,350
[45] Date of Patent: Jun. 8, 1999

[54] STARCH FOAM PANEL

[75] Inventors: Juergen Loracks, Rees; Winfried Pommeranz, Enger; Harald Schmidt, Emmerich, all of Germany

[73] Assignee: Bio-Tec Biologische Naturverpackugen GmbH, Emmerich, Germany

[21] Appl. No.: 08/793,939

[22] PCT Filed: Sep. 5, 1995

[86] PCT No.: PCT/EP95/03488

§ 371 Date: Mar. 5, 1997

§ 102(e) Date: Mar. 5, 1997

[87] PCT Pub. No.: WO96/07539

PCT Pub. Date: Mar. 14, 1996

[30] Foreign Application Priority Data

Sep. 6, 1994 [DE] Germany .............................. 44 31 755

[51] Int. Cl.$^6$ ................................ B32B 5/26; B32B 9/06; B32B 31/08; G09F 9/00

[52] U.S. Cl. .............................. 428/71; 156/78; 156/163; 156/244.19; 156/244.27; 264/46.1; 264/46.4; 264/46.5; 428/318.4; 428/319.1

[58] Field of Search .................................... 428/71, 304.4, 428/318.4, 319.1; 156/163, 164, 244.11, 244.27, 292.78, 244.19; 264/45.9, 46.1, 46.4, 46.5

[56] References Cited

U.S. PATENT DOCUMENTS

| 4,613,627 | 9/1986 | Sherman et al. ............................ 521/68 |
| 4,755,408 | 7/1988 | Noel .......................................... 428/36 |
| 4,863,655 | 9/1989 | Lacourse et al. ........................... 264/53 |

FOREIGN PATENT DOCUMENTS

| 0376201 | 7/1990 | European Pat. Off. |
| 2826729 | 2/1979 | Germany . |
| 3531248 | 3/1987 | Germany . |
| 4228779 | 3/1994 | Germany . |
| 4317697 | 12/1994 | Germany . |
| 1582696 | 1/1981 | United Kingdom . |
| 2221869 | 2/1990 | United Kingdom . |
| 94/05492 | 3/1974 | WIPO . |
| 92/16584 | 10/1992 | WIPO . |
| 95/02000 | 1/1995 | WIPO . |

OTHER PUBLICATIONS

DE 4317697 (english abstact), Dec. 1994.
DE 4228779 (english abstract), Mar. 1994.
English Translation of DE 42 28 779, Mar. 1994.
English Translation of WO 94/05492, Mar. 1994.

*Primary Examiner*—Blaine R. Copenheaver
*Attorney, Agent, or Firm*—Venable; George H. Spencer; Ashley J. Wells

[57] ABSTRACT

A panel including a starch foam core which is composed of starch, which is one of resilient foam or hardened foam; and which has a form selected from the group consisting of a plurality of strands which are straight and in essentially parallel alignment with one another, and a plurality of strands which are bent and arranged in an undulating path; and at least one outer layer composed of sheet material and provided directly on a surface of the starch foam core in engaging contact therewith; wherein the panel is prepared in a continuous process. A method for preparing the panel includes preparing a starch foam in an extruder; forming the starch foam core by extruding the starch foam in a form selected from the group consisting of strands which are straight and in essentially parallel alignment with one another, and strands which are bent and arranged in an undulating path; immediately after forming the starch foam core, directly and continuously introducing the starch foam core into direct surface contact with the at least one outer layer; and compacting the starch foam core and simultaneously bonding the starch foam core directly to the at least one outer layer to form the panel.

17 Claims, 1 Drawing Sheet

STARCH FOAM PANEL

BACKGROUND OF THE INVENTION

1. Field of the Invention

The invention relates to a biodegradable sandwich panel which is based on starch foam and a process for preparing the same.

2. Description of the Related Art

Composite materials or composite panels, as the case may be, which have a core coated with polyurethane foam or polystyrene foam are known. The disposal of such plastics is difficult since they virtually do not rot and can only be recycled after sorting.

DE-A-42 28 779 discloses a laminated composite material the layers of which consist of hardened starch foam and an additional layer material. The process for preparing the starch foam and the laminated composite material is a multi-step process. Moreover, the starch foam has to be cured in order to effect the bonding to the additional layer material. WO 92/16584 relates to a biodegradable polymer compound on the basis of destructurized starch with synthetic additives for the preparation of molded articles by means of common process techniques.

It is an object of the invention to provide a biodegradable sandwich panel characterized by multiple applications and a simple and cost-efficient preparation process.

SUMMARY OF THE INVENTION

This object is achieved by the features of the claims.

In achieving the object, the invention is based on the concept of providing a sandwich material having a biodegradable cover material made of paper and/or paperboard and/or a sheeting and a core made of extruded starch foam, which sandwich material is prepared in a continuous process wherein a starch foam is prepared in an extrusion process, introduced in situ between paper or cardboard webs and/or sheeting, pressed in a continuously operating roller press and processed. The number of paper and starch foam layers is arbitrary. If the sandwich material obtained with this process has a cross-section below 20 mm and a soft, flexible setting of the starch foam, it is prepared as an endless material wound on a roll. With a hard setting of the starch foam and/or cross-sections being greater than 20 mm, the sandwich panels are cut to a desired size after pressing.

Depending on the demand profile of the sandwich material, the specific weight of the starch foam core can be 10 to 250 kg/m$^3$ and the weight per unit area of the paper and/or cardboard and/or sheeting cover layers can be 10 to 800 g/m$^2$. The sandwich panels provided by the present invention fulfil the same application purpose as a packaging material, as a construction material for low temperature, heat or sound insulation, as protection during transport and against shock, as a display and carrier for placards, posters, pictures and imprints, and they are recyclable in the paper-making cycle.

The advantages of the sandwich panels according to the present invention reside above all also in a simple preparation process in which all process steps take place continuously without intermediate steps and which can easily be changed so that, if required, a respectively shaped rigid or resilient sandwich panel can be prepared immediately, which exhibits, for example, a desired heat or low temperature insulation or also shock absorption properties.

BRIEF DESCRIPTION OF THE DRAWINGS

In the following, the invention is explained in more detail in connection with the drawings in which.

DESCRIPTION OF THE PREFERRED EMBODIMENTS

According to a preferred embodiment of the invention, a sandwich panel according to the present invention consists of a starch foam core 1, the upper and lower surfaces thereof being bonded to a layer material 2. The layer material 2 preferably consists of a biodegradable material such as sheeting made of modified starch, paper and/or paperboard and/or cardboard.

Figure 1:
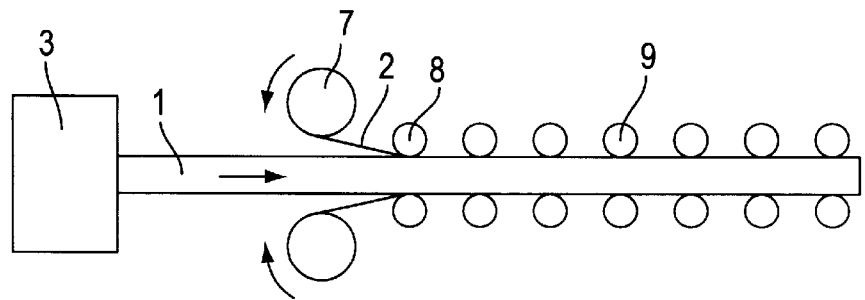
FIG. 1: is the method principle for the preparation of sandwich panels according to the present invention.
Figure 2:
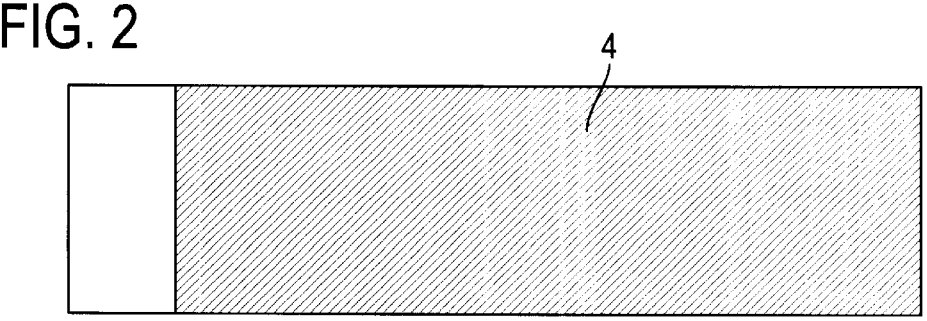
FIG. 2: is a view onto the extruder arrangement extruding an all-over starch foam core.
Figure 3:
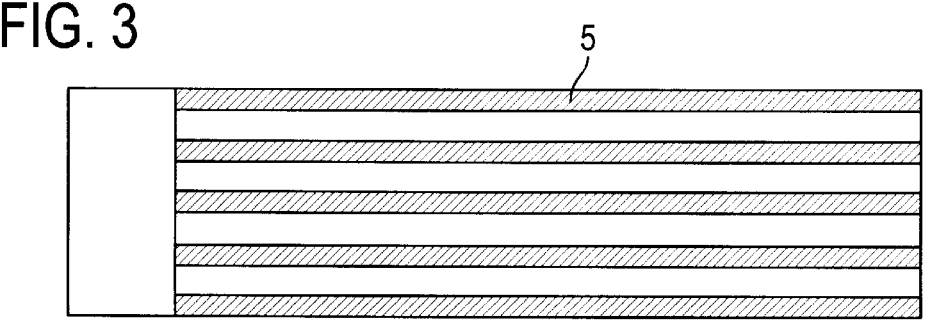
FIG. 3: is a view onto the extruder arrangement extruding rod-like starch foam strands as a core for the sandwich panel according to the present invention.
Figure 4:
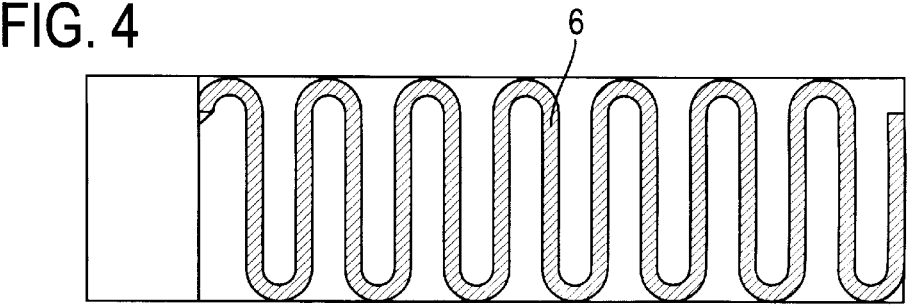
FIG. 4: is a view onto the extruder arrangement extruding starch foam strands winding like a snake as a core for the sandwich panel according to the present invention.

As shown in FIG. 1, a plant for the preparation of a sandwich panel according to the present invention includes an extruder arrangement 3 in which starch foam is prepared and subsequently extruded through a die as a band 4 (FIG. 2), rod-like strands 5 (FIG. 3) or strands 6 winding like a snake (FIG. 4). In their respective shape, the band 4 or the strands 5, 6 form the starch foam core 1 of the sandwich panel. Immediately after extrusion, the starch foam core 1 is introduced between two bands of the layer material 2. For that, the layer material 2 is continuously unwound from two rolls 7 placed one above the other, stretched over deflection rollers 8 and brought together in a horizontal direction up to a predetermined distance. Therefore, the layer material 2 exhibits a predetermined minimum tensile strength. The starch foam core 1 is introduced between the layer material 2 in the unwinding direction, subsequently brought into contact with the layer material 2 in a roller press 9 and pressed to form a sandwich panel. During this process, the starch foam 1 still has a minimum residual moisture from the extrusion process so that the bonding property of the starch remains activated and a bonding to the layer material 2 is produced. The moisture extraction of the starch can be adjusted individually during extrusion, or the starch foam core 1 can also be moistened on its contact surfaces prior to the bonding to the layer material 2. After the sandwich material leaves the roller press 9, it is wound on rolls or cut into a desired length and stacked. The winding up is especially advantageous if the sandwich panels have an elastic starch foam core 1 and a thickness of less than 20 mm; however, it is advantageous to stack thicker sandwich panels. This process allows the preparation of sandwich panels with, for example, special thermal insulating values or shock absorption properties. Depending on the use of the sandwich panels, the starch foam core 1 can have a predetermined density and elasticity or form hollow spaces in the sandwich panel such as, for example, in the processing of starch foam strands 5, 6. Moreover, a plurality of layers of starch foam cores 1 and layer material 2 can be bonded on top of one another. In order to change the desired properties, the formulation of the raw materials used in the extrusion process or the process steps of the extrusion process, for example, can be altered even with respect to the time schedule or the temperature profile. Preferably, the sandwich material according to the present invention comprises a starch foam core 1 with a specific weight of about 10 to 250 kg/m$^3$ and a layer material 2 with a weight per unit area of 10 to 800 g/m$^2$.

The sandwich panels according to the present invention can be used as a packaging material, as a construction material for heat, low temperature or sound insulation, as protection during transport and against shock, as a display and carrier for placards, posters, pictures and imprints, and as structural products for the furniture, automobile, construction and packaging industry, for horticulture and agriculture.

What is claimed is:

1. A panel, comprising:
    a starch foam core which is comprised of starch, which is one of resilient foam or hardened foam; and which has a form selected from the group consisting of a plurality of strands which are straight and in essentially parallel alignment with one another, and a plurality of strands which are bent and arranged in an undulating path; and
    at least one outer layer comprised of sheet material and provided directly on a surface of the starch foam core in engaging contact therewith;
    wherein the panel is prepared in a continuous process.

2. The panel according to claim 1, wherein the sheet material is selected from the group consisting of modified starch sheet, paper, paperboard, and cardboard.

3. The panel according to claim 1, wherein the sheet material is biodegradable and the panel is biodegradable.

4. The panel according to claim 1, wherein the starch foam core has a weight per unit volume ranging from 10 to 250 kg/m$^3$ and the at least one outer layer has a weight per unit area ranging from 10 to 800 g/m$^2$.

5. The panel according to claim 1, consisting of a pair of the outer layers between which the starch foam core is sandwiched.

6. A method for preparing a panel according to claim 1, comprising:
    preparing a starch foam in an extruder;
    forming the starch foam core by extruding the starch foam in a form selected from the group consisting of strands which are straight and in essentially parallel alignment with one another, and strands which are bent and arranged in an undulating path;
    immediately after forming the starch foam core, directly and continuously introducing the starch foam core into direct surface contact with the at least one outer layer; and
    compacting the starch foam core and simultaneously bonding the starch foam core directly to the at least one outer layer to form the panel.

7. The method according to claim 6, wherein the starch foam is extruded to have a weight per unit volume ranging from 10 to 250 kg/m$^3$.

8. The method according to claim 6, wherein the sheet material is selected from the group consisting of modified starch sheet, paper, paperboard, and cardboard.

9. The method according to claim 6, wherein the sheet material is biodegradable and the panel is biodegradable.

10. The method according to claim 6, wherein, immediately after forming the starch foam core by extruding, the starch foam core is directly and continuously introduced into direct surface contact with the at least one outer layer and bonded thereto.

11. The method according to claim 6, wherein the panel consists of a pair of the outer layers between which the starch foam core is sandwiched.

12. The method according to claim 11, wherein, immediately after forming the starch foam core by extruding, the starch foam core is directly and continuously introduced into direct surface contact with respective ones of the pair of the outer layers and bonded thereto.

13. The method according to claim 6, wherein, when the starch foam core is one of (a) hardened or (b) has a thickness of more than 20 mm, the method further comprises cutting the panel into a predetermined length after compacting.

14. A construction material for at least one of heat insulation, low temperature insulation, sound absorption and shock absorption, comprising:
    a panel comprised of (a) a starch foam core which is comprised of starch, which is one of resilient foam or hardened foam; and which has a form selected from the group consisting of a plurality of strands which are straight and in essentially parallel alignment with one another, and a plurality of strands which are bent and arranged in an undulating path; and (b) at least one outer layer comprised of sheet material and provided directly on a surface of the starch foam core in engaging contact therewith; and prepared in a continuous process according to the method defined in claim 6.

15. A packaging material for protecting articles during transport and against shock, comprising:
    a panel comprised of (a) a starch foam core which is comprised of starch, which is one of resilient foam or hardened foam; and which has a form selected from the group consisting of a plurality of strands which are straight and in essentially parallel alignment with one another, and a plurality of strands which are bent and arranged in an undulating path; and (b) at least one outer layer comprised of sheet material and provided directly on a surface of the starch foam core in engaging contact therewith; and prepared in a continuous process according to the method defined in claim 6.

16. A display and carrier for at least one of placards, posters and pictures, comprising:
    a panel comprised of (a) a starch foam core which is comprised of starch, which is one of resilient foam or hardened foam; and which has a form selected from the group consisting of a plurality of strands which are straight and in essentially parallel alignment with one another, and a plurality of strands which are bent and arranged in an undulating path; and (b) at least one outer layer comprised of sheet material and provided directly on a surface of the starch foam core in engaging contact therewith; and prepared in a continuous process according to the method defined in claim 6.

17. A construction product for at least one industry selected from the group consisting of furniture, automobile, construction, packaging, horticulture, and agriculture, comprising:
    a panel comprised of (a) a starch foam core which is comprised of starch, which is one of resilient foam or hardened foam; and which has a form selected from the group consisting of a plurality of strands which are straight and in essentially parallel alignment with one another, and a plurality of strands which are bent and arranged in an undulating path; and (b) at least one outer layer comprised of sheet material and provided directly on a surface of the starch foam core in engaging contact therewith; and prepared in a continuous process according to the method defined in claim 6.

* * * * *